Feb. 27, 1951     M. H. TRACY     2,543,561
METHOD OF AND APPARATUS FOR DISPLAYING A
PROJECTED IMAGE OF A DRAWING
Filed Jan. 27, 1949     2 Sheets—Sheet 1
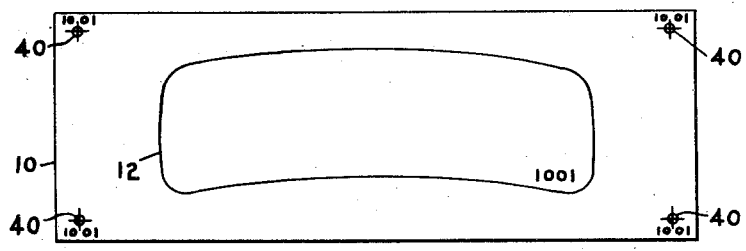
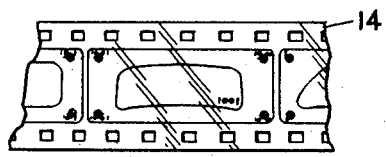
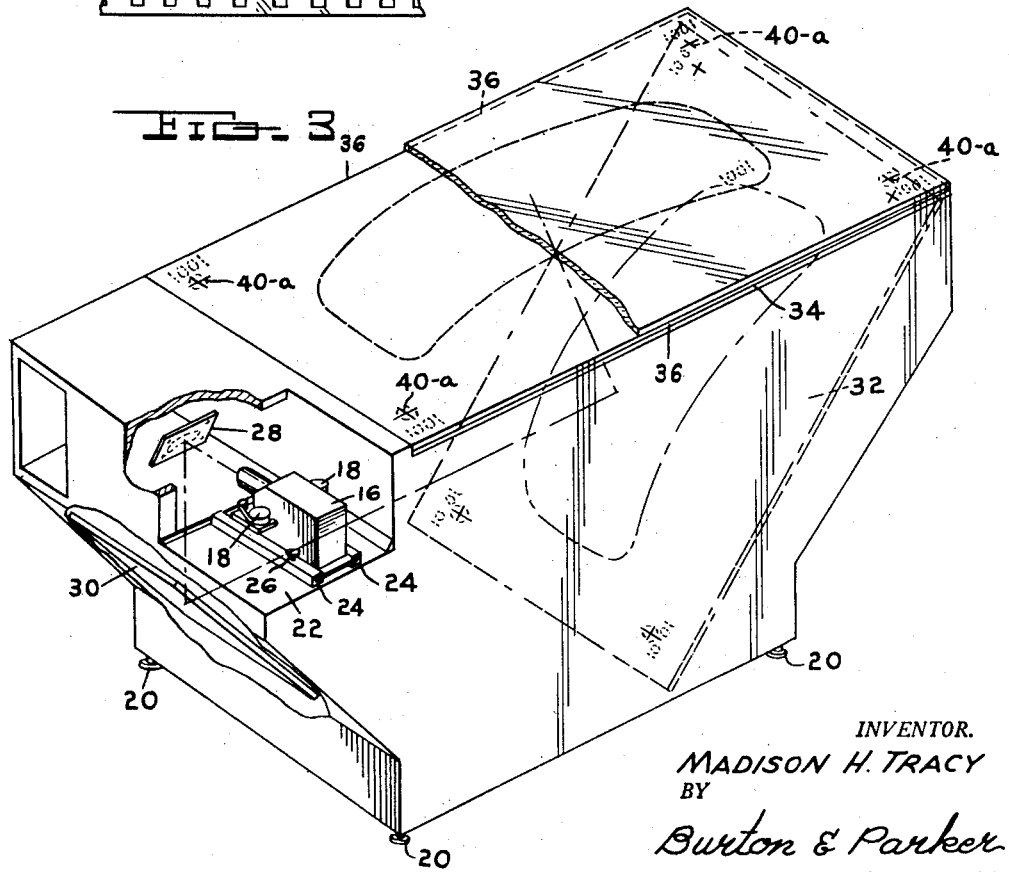
INVENTOR.
MADISON H. TRACY
BY
Burton & Parker
ATTORNEYS Feb. 27, 1951 M. H. TRACY 2,543,561
METHOD OF AND APPARATUS FOR DISPLAYING A
PROJECTED IMAGE OF A DRAWING
Filed Jan. 27, 1949 2 Sheets-Sheet 2
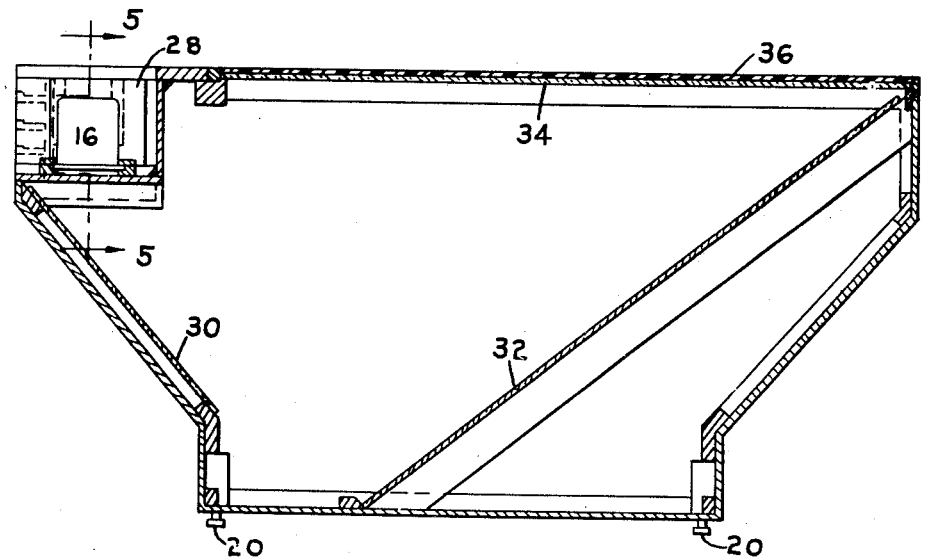
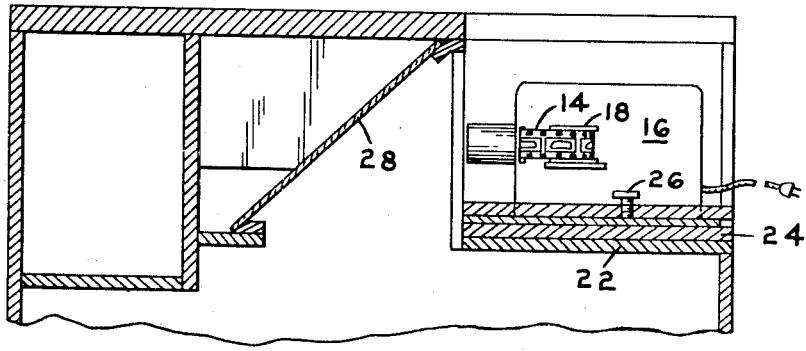
INVENTOR.
MADISON H. TRACY
BY
Burton & Parker
ATTORNEYS Patented Feb. 27, 1951

2,543,561

UNITED STATES PATENT OFFICE 2,543,561

METHOD OF AND APPARATUS FOR DISPLAYING A PROJECTED IMAGE OF A DRAWING

Madison Harold Tracy, Detroit, Mich.

Application January 27, 1949, Serial No. 73,145

6 Claims. (Cl. 88—24)

This invention relates to an improved process of and apparatus for displaying an image of a pattern drawing or the like in such a manner as to facilitate use thereof, as for example, copying in whole or in part, or cutting glass to the same size and shape.

More particularly an object is to provide an improved process of and apparatus for displaying an image of a designated glass pattern in the correct size and shape and in such a manner that a sheet of glass may be superimposed thereon and cut to the size and shape thereof.

Another object of this invention is to provide an improved process of and apparatus, including a complete library of glass pattern drawings for all of the different windows of all of the models and makes of automobiles, for displaying an image of the pattern desired in such a manner that a sheet of glass may be readily cut to the size and shape of the pattern, and which apparatus is inexpensive and occupies a minimum amount of space.

More particularly, an object is to provide apparatus of the character described which includes reduced size reproductions on film of full size glass patterns for all the different windows for all of the models and makes of automobiles, and projection and display mechanism whereby any selected reduced size reproduction of a pattern may be projected onto a screen as a full size image of the pattern, and which screen may serve as a cutting table upon which a sheet of glass may be placed to be cut to the size of the image projected on the screen.

A meritorious feature of the invention resides in the provision of projection and display apparatus of such a character that a reduced size reproduction of a pattern on a film may be projected in the size of the pattern onto one surface of a screen in such a manner as to be visible from the opposite surface thereof and such opposite surface is of such a character as to serve to properly support a sheet of glass for cutting of the same to the size of the image projected onto the screen.

Another meritorious feature resides in the provision of projection and display apparatus which includes a translucent screen so associated with projecting mechanism that a reduced size film image of a pattern may be projected onto one surface of the screen in the size of the original pattern, and such image may be viewed on the opposite surface of the screen, and such opposite surface is formed of cushioning material suitable to support a sheet of glass through which the image may be viewed.

A further meritorious feature is the provision of a pattern which carries registering marks which marks appear on a reduced size reproduction of the pattern on a film and the provision of a screen which carries similar registering marks similarly disposed to correspond with the registering marks on the pattern so that when the pattern image is projected properly onto the screen from the film, the projected registering marks will register with the registering marks provided on the screen and thereby show that the image projected onto the screen is of the size of the pattern.

My improved projection and display apparatus is embodied in an inexpensive cabinet of relatively small size, the top of which consists of a translucent screen upon which a glass sheet can be supported for cutting, and wherein there is projector mechanism proper and a sequence of mirrors disposed within the cabinet between the projector and the screen so as to project images onto the under surface of the screen to be visible on the top surface thereof.

Other objects, advantages and meritorious features will more fully appear from the following specification, claims and accompanying drawings, wherein:

Fig. 1 is a plan of a pattern drawing typical of the type employed;

Fig. 2 is a plan of a fragment of a film including the panel which shows a reduced size reproduction of the drawing;

Fig. 3 is a perspective of a display cabinet for displaying an image of a drawing so that a pane of glass may be cut to the size thereof;

Fig. 4 is a vertical cross-sectional view taken lengthwise through the cabinet shown in Fig. 3; and Fig. 5 is a fragmentary cross-sectional view taken on the line 5—5 of Fig. 4.

This improved process of and apparatus for displaying a drawing in the exact size for viewing, copying or working against as in cutting glass to the size thereof, is illustrated as embodied in automobile glass pattern apparatus whereby the pattern for any particular automobile glass pane may be projected onto a screen which screen also serves as a cutting table to support a sheet of glass for cutting to the size of the pattern image.

Throughout the specification, the word "translucent" is used to describe the screen by which is meant a screen so constituted that an image projected onto one surface thereof is visible on the opposite surface. The word "film" is used to describe the sheet material upon which the reduced size image of the drawing to be displayed appears and by this is meant any suitable sheet material upon which an image appears in such form that it may be projected onto a screen from a projector. The word "projector" refers to any suitable projection mechanism whereby a film image may be thrown onto a screen for viewing.

A pattern drawing or template of the exact size is prepared for each different glass pane for each make and model of motor vehicle. An example of such a pattern drawing is indicated at 10 in Fig. 1. The elongate slightly upwardly arcuate figure 12 indicates the exact size and shape of the glass pane to be cut. In one corner there appears on the pattern its number, here shown at 1001. Such number also appears in each corner of the drawing as shown. A library of these master patterns is maintained. Such pattern drawings are reproduced on rolls of film and in the desired groupings for models, makes and years of motor vehicles and in a predetermined reduced size. I have found a reduction to 1/37 of the size of the original drawing to be satisfactory for the particular apparatus and process now at hand.

In order to display such drawings for use to cut glass to the size thereof, I provide conventional projector mechanism 16 which includes wheels 18 upon which the film 14 is adapted to be wound to pass through the projector mechanism for throwing upon the screen. The projector mechanism forms a part of a display cabinet shown in Figs. 3, 4 and 5. The cabinet itself is a generally elongate structure supported upon legs 20 which may be adjustable to vary the height. It includes at one end a shelf 22 provided with a pair of slides 24 between which the base plate of the projector mechanism is supported to be moved back and forth and held at adjusted positions by an adjustment screw 26. This projector mechanism is adapted to throw an image on the film onto a mirror 28 which mirror is so disposed as to reflect the image onto a second mirror 30 which second mirror is so disposed as to reflect its image onto a third mirror 32. This mirror 32 is so disposed as to reflect the image upwardly onto a translucent screen which serves as the top of the cabinet. This screen is here shown as formed of a sheet of plate glass 34 covered with a sheet of translucent plastic material 36. A translucent plastic sheet which has been found suitable is one form of Vinylite.

The relative disposition of the mirrors and projector mechanism with respect to each other and with respect to the screen is such that when an image which has been reduced to 1/37 of its original size is projected by means of the mirrors onto the under surface of the screen, it appears thereon in the same size as it appeared on the original drawing. The slidable mounting of the projector is such that it may be moved toward and away from the mirror 28 sufficiently to vary the size of the image thrown on the screen to the extent of one magnification whereby the image on the screen may be brought to the exact size desired.

In order to be sure that the image on the screen is in the proper size, there is provided on the master pattern four registering marks indicated as 40, one in each corner of the pattern. These marks are disposed a determined distance apart. They appear also on the film. The screen itself is provided with registering marks 40a, four of which are shown one in each corner, and these marks 40a are disposed apart the same distance as the marks on the pattern drawing. When the image is thrown upon the screen from the film and the registering marks projected on the screen register with the registering marks provided on the screen, it is known that the projected image is of the exact size of the master drawing.

As shown in the figures of the drawing, the mirrors are supported within the cabinet at such an angle with respect to each other that the film image is thrown on the under surface of the screen. The upper surface of the screen is formed by the plastic sheet which is material that is relatively compressible and might be termed cushioning material in the sense that it would serve as a cushion support for a sheet of glass placed thereon for cutting to the size of a image projected onto the screen. Due to the translucent character of the screen, an image projected onto its underside may be readily viewed through a sheet of glass laid on the upper surface of the screen and the glass is so supported beyond the margin of the portion that is to be cut out to provide the glass pane so that danger of breakage of the glass sheet during the cutting operation is minimized.

What I claim is:

1. That method of displaying a drawing comprising preparing a drawing in exact size to be displayed, providing registering marks on the drawing, producing on a film a reduced size image of the drawing including the registering marks thereon, providing a translucent screen with registering marks relatively disposed thereon corresponding with the relative disposition of the registering marks on the drawing, projecting such film image upon one surface of the translucent screen in a size corresponding to that of the drawing and with the registering marks of the film projected onto the screen in registration with the registering marks provided on the screen and for viewing of the image on the screen from the surface opposite to that on which it has been projected.

2. In apparatus of the class described, a translucent screen provided on one surface with glass supporting cushioning material, said screen bearing registering marks, a film bearing a reduced size image of a drawing including registering marks disposed to correspond with the registering marks on the screen, projection apparatus disposed to project the film image upon the opposite surface of the screen enlarged in size to agree with the size of the drawing and to project the registering marks to register with the registering marks provided on the screen and for the viewing thereof on the cushioning surface of the screen.

3. That method of cutting glass to the determined size and shape comprising providing on a pattern sheet a drawing of the exact size and shape desired and providing on said sheet registering marks associated with the drawing, producing on a film a reduced size image of the pattern sheet drawing and associated registering marks, providing translucent screen having a glass supporting cushioning surface bearing registering marks relatively positioned thereon corresponding with the relative position of the registering marks on the pattern sheet, projecting said film image upon the screen with the registering marks on the film projected onto the screen in registration with the registering marks provided on the screen, positioning a sheet of glass upon the screen for viewing of the projected image therethrough and cutting the glass to the size and shape of the projected image.

4. That method of cutting a plurality of glass plates of different size and shape comprising providing a plurality of pattern sheets containing drawings of different size and shape and providing on each of said pattern sheets registering marks associated with the drawing thereon, the registering marks on each sheet being relatively positioned precisely the same distances apart as the registering marks on every other sheet, providing a translucent screen with registering marks thereon positioned precisely the same distances apart as the registering marks on each of the several sheets, producing on a film a reduced size image of the drawing of each pattern sheet and its associating registering marks, projecting said film images singly and in succession upon one surface of the translucent screen with the registering marks of the projected film image in registration with the registering marks on the screen and positioning a sheet of glass upon the screen over said projected film image and cutting the glass to the size and shape of said projected image.

5. In apparatus of the class described, a cabinet having a flat top comprising a translucent screen provided on its upper surface with a layer of glass supporting cushioning material, said screen bearing registering marks, a film bearing a reduced size image of a pattern drawing including registering marks relatively positioned and spaced apart precisely as the registering marks on the screen, and projector mechanism arranged to project the film image and associated registering marks along a path within said cabinet onto the under surface of the screen to be viewed on the supper surface of the screen and with the projected registering marks in registration with the registering marks on the screen.

6. In apparatus of the class described, a translucent screen provided on one surface with glass supporting cushioning material, said screen bearing registering marks positioned determined distances apart, a film bearing a succession of reduced size images of a plurality of different drawings each drawing having associated therewith registering marks relatively positioned identically with the registering marks on each of the other drawings and with the registering marks on the screen, projection apparatus disposed to project each film image upon the under surface of the screen with the registering marks associated with the film image in registration with the registering marks provided on the screen, said film images projected on the screen being visible upon the glass supporting cushioning surface of the screen.

MADISON HAROLD TRACY.

REFERENCES CITED

The following references are of record in the file of this patent:

UNITED STATES PATENTS

| Number | Name | Date |
|---|---|---|
| 1,242,674 | Fleischer | Oct. 9, 1917 |
| 1,605,699 | Bourges | Nov. 2, 1926 |
| 1,916,567 | Grant | July 4, 1933 |
| 2,090,270 | Swanson | Aug. 17, 1937 |
| 2,186,330 | Fitzgerald | Jan. 9, 1940 |
| 2,192,529 | Thomas et al. | Mar. 5, 1940 |
| 2,372,494 | Hogan et al. | Mar. 27, 1945 |
| 2,372,762 | Crouse | Apr. 3, 1945 |
| 2,381,164 | Hedin | Aug. 7, 1945 |
| 2,386,806 | Le Doux | Oct. 16, 1945 |
| 2,464,794 | Cooke | Mar. 22, 1949 |

FOREIGN PATENTS

| Number | Country | Date |
|---|---|---|
| 706,001 | France | Mar. 23, 1931 |